United States Patent [19]
Keefer

[11] Patent Number: 4,786,773
[45] Date of Patent: Nov. 22, 1988

[54] SYSTEMS AND METHODS FOR DETERMINING DONENESS OF MICROWAVE-HEATED BODIES

[75] Inventor: Richard M. Keefer, Peterborough, Canada

[73] Assignee: Alcan International Limited, Montreal, Canada

[21] Appl. No.: 943,680

[22] Filed: Dec. 18, 1986

[51] Int. Cl.⁴ .............................................. H05B 6/80
[52] U.S. Cl. ...................... 219/10.55 E; 219/10.55 F; 219/10.55 M; 426/88; 426/107; 426/243; 116/216; 374/161; 374/149
[58] Field of Search .................. 219/10.55 E, 10.55 F, 219/10.55 B, 10.55 M, 10.55 R, 506; 426/88, 241, 243, 107; 374/159, 160, 161, 162, 149, 141; 116/216, 219

[56] References Cited

U.S. PATENT DOCUMENTS

| | | | |
|---|---|---|---|
| 2,490,933 | 12/1949 | Tornquist et al. | 426/88 X |
| 3,479,877 | 11/1969 | Allen | 374/160 X |
| 3,849,622 | 11/1974 | Merriam | 219/10.55 E |
| 3,967,579 | 7/1976 | Seiter | 116/219 |
| 4,190,757 | 2/1980 | Turpin et al. | 219/10.55 E |
| 4,230,924 | 10/1980 | Brastad et al. | 219/10.55 E |
| 4,410,493 | 10/1983 | Joslyn | 426/88 X |
| 4,428,321 | 1/1984 | Arens | 116/217 |
| 4,448,548 | 5/1984 | Foley | 426/88 X |
| 4,640,838 | 2/1987 | Isakson et al. | 426/107 |

*Primary Examiner*—Philip H. Leung
*Attorney, Agent, or Firm*—Cooper & Dunham

[57] ABSTRACT

For determining doneness of a body of food or other material heated in a microwave oven, a device including an indicator that changes appearance at a predetermined temperature, mounted on an outwardly-facing major surface of a thin-gauge metal element which is disposed in the oven so as to receive heat from the body. The metal element may be mounted on the lid or other wall of a container holding the body in the oven; the lid may be microwave-transmissive and may hold the metal element spaced above the body. The indicator may include a substance that melts at the predetemined temperature to reveal an underlying color or pattern on the metal element surface. In use, the device is placed in a microwave oven together with the body and is observed visually, for detection of the change of appearance, which occurs when the indicator reaches a temperature corresponding to adequate doneness of the body.

21 Claims, 1 Drawing Sheet

SYSTEMS AND METHODS FOR DETERMINING DONENESS OF MICROWAVE-HEATED BODIES

BACKGROUND OF THE INVENTION

This invention relates to systems and methods for determining the "doneness" of a body of material being heated by microwave energy.

For purposes of illustration, detailed reference will be made herein to the microwave cooking of foodstuffs, as representing one important field of use of the invention, although the invention may also be employed in the microwave heating of bodies of material other than foods. The term "microwave oven" will be utilized in the following discussion in a broad sense to embrace both conventional microwave (cooking) ovens and other apparatus by means of which a body of material may be irradiated with and heated by microwave energy.

The term "doneness" designates the attainment of a desired heated condition in the food or other body being subjected to microwave heating. In the case of cooking, for example, a foodstuff achieves doneness when it reaches a desired adequately cooked condition, from the standpoint of such factors as flavor, texture, appearance, and/or health considerations. Typically, doneness is a function of both time and temperature, rather than simply constituting the attainment of a particular elevated temperature by any portion of the body being heated; thus, a condition of doneness may be reached when the body has been maintained at such temperature for a particular time interval, or, if heating occurs unevenly through the body, when some degree of temperature equilibration has occurred.

In microwave heating, it is particularly desirable to provide an indication of doneness associated with the particular body of material being heated. Although heating-time directions are commonly given for microwave cookery, the heating of foods (and other substances) by microwave radiation is generally rapid, and is sensitive to the size, shape and composition of the body being heated; moreover, different microwave ovens vary significantly from each other in respect of actual operating times required to achieve doneness in a given body of foodstuff. Consequently, general directions do not afford a reliable guide to the attainment of satisfactory results. In addition, heating of a body of material in a microwave oven tends to be very uneven, being dependent on the specific microwave field pattern established by the cooperative effects of the oven, container geometry, and the body.

Ordinarily, a microwave oven has a window through which the interior may be viewed, but it is often difficult to determine doneness by mere visual inspection of the surface of the foodstuff being cooked. Indeed, in many instances the food is concealed by a package or container in which it is placed within the oven, e.g. to aid in achieving specific heating effects, to prevent splatter, and/or for the sake of convenience, since one of the special virtues of a microwave oven is its ability to heat prepackaged foods without unwrapping them.

SUMMARY OF THE INVENTION

An object of the present invention is to provide systems and methods for producing a simple, readily detectable, positive and reliable indication of doneness of a body of material being heated in a microwave oven, such indication being visible (for example) through a conventional microwave oven window as heating proceeds. A further, specific object is to provide such systems and methods including a visible indicator incorporated in a package or container within which the body is enclosed while being heated.

To these and other ends, the present invention, in a first aspect, broadly contemplates the provision of a system for indicating doneness of a body of material heated by microwave energy, comprising a thin electrically conductive metal element having first and second opposed extended surfaces (i.e., opposed major surfaces); indicator means disposed on the first surface of the element for producing a visually observable change of appearance upon being heated to a predetermined elevated temperature or maintained at a predetermined elevated temperature for a predetermined time; and means for supporting the element in substantially fixed relation to the body, when the body is disposed in a microwave oven for heating by microwave energy, such that the element is also disposed in the oven with the indicator means positioned to be externally visible, and such that the element receives heat from the body by conduction and/or radiation as the body is heated by microwave energy. In this system, in accordance with the invention, the dimensions of the element and the disposition of the indicator means thereon are such as substantially to shield the indicator means from temperature-elevating irradiation by microwave energy.

Owing to the shielding effect of the metal element, the change of appearance of the indicator means results from heat radiated and/or conducted from the body rather than being produced by direct microwave irradiation of the indicator. This is important, because many temperature-responsive substances capable of use as or in indicator means are themselves susceptible of direct heating by microwave energy, and if placed unshielded in a microwave oven, would produce a false positive indication (change of appearance) as a result of direct microwave heating of the indicator substance, unrelated to the temperature or heated condition of the body.

The indicator means employed may be so constituted as to undergo either a chemical change or a physical change upon attaining the predetermined elevated temperature. An example of an indicator that undergoes a chemical change is a layer of thermochromic material applied to the first surface of the metal element. Examples of indicators that undergo a physical change include those incorporating a substance that undergoes a change of state (typically from solid to liquid, i.e. by melting) upon attaining the predetermined elevated temperature.

One specific and currently preferred type of such indicator means comprises a first layer characterized by a visually distinctive color, applied to the first surface of the metal element, and a second layer outwardly covering the first layer and comprising a substance that undergoes a change of state as aforesaid, this second layer being substantially opaque at temperatures below the predetermined temperature so as to mask the first layer, but becoming substantially transparent, so as to reveal the first layer, when the substance undergoes the change of state. The second layer may also include a substantially opaque porous web that becomes substantially transparent when wetted, the web extending over the first layer and being in intimate contact with the state-changing substance, which in this case must be a substance that melts at the predetermined temperature so as to wet the web.

The second surface of the metal element my be a heat-reflective surface, or it may bear a heat-absorptive coating, to achieve desired thermal response of the indicator. Also, in currently preferred embodiments of the invention, the supporting means includes a sheetlike dielectric member transmissive to microwave energy and having opposed major surfaces for respectively facing inwardly toward and outwardly away from the body, the metal element being secured to the outwardly facing surface of the dielectric member. Again conveniently or preferably, the metal element is a metal foil member.

The system of the invention is advantageously incorporated in microwave food packaging. Thus, the supporting means of the system may be a food package or other container having wall structure for at least partially enclosing the body to be heated, the metal element being included in such wall structure. In especially preferred embodiments of the invention, wherein the wall structure includes a container lid fabricated of dielectric material transmissive to microwave energy and having inner and outer major surfaces, the metal element is disposed at the outer surface of the lid, being typically or conveniently a metal foil island bonded to the outer surface of the lid.

In these embodiments, the system may further be considered to include the body of material to be heated, disposed in the container. As a further feature of invention in such a system, the lid is spaced from the body. Also advantageously, in such a system, wherein the container (including the metal element) and the body to be heated cooperatively define a microwave field pattern that determines the rapidity of heating of various regions of the body, such that at least one region of the body heats more slowly than another region of the body, the metal element is disposed on the lid in directly overlying relation to the more slowly heating region.

A complete system in accordance with the invention additionally includes a microwave oven in which the container (holding the body to be heated) is disposed in a position for heating by microwave energy.

In a second aspect, the invention contemplates the provision of a method of determining the doneness of a body of material heated by microwave energy comprising placing, in a microwave oven for heating, the body together with a thin electrically conductive metal element having first and second opposed extended surfaces and bearing on its first surface indicator means for producing a visually observable change of appearance upon being heated to a predetermined elevated temperature or maintained at such temperature for a predetermined time, this element being supported in the oven, in substantially fixed relation to the body with the indicator means positioned to be externally visible, such that the element receives heat from the body by conduction and/or radiation when the body is heated, the dimensions of the element and the disposition of the indicator means thereon being such as substantially to shield the indicator means from temperature-elevating irradiation by microwave energy; and, while energizing the oven to heat the body with microwave energy, observing the indicator means to detect the occurrence of said change of appearance. This method may also include the step of terminating the heating of the body when the change of appearance in the indicator means occurs.

In the systems and methods of the invention, the change of appearance produced in or by the indicator means upon attaining a predetermined elevated temperature does not necessarily constitute a mere indication that some part of the body being heated has achieved such temperature. In this regard, it will be understood that in a microwave oven (unlike other types of ovens) the chief or only significant source of heat within the oven, during use, is the heated body itself, since heat is produced within the body by the irradiating microwave energy. Consequently, the attainment of a predetermined temperature by an indicator disposed within the oven but outside the body corresponds to a particular heated condition of the body.

For instance, in specific embodiments of the invention mentioned above, a container lid or other member of relatively low thermal conductivity interposed between the metal element and the body being heated, and/or a gap or air space provided between the metal element and the body, can serve as a delay mechanism so that the response of the indicator follows by some interval of time the initial attainment of the predetermined temperature in the body, thereby accurately representing a condition of doneness achieved by a combination of time and temperature. Again, the positioning of the metal element over the body region that heats most slowly can afford an accurate indication of a doneness condition for which the attainment of a predetermined temperature is critical. The high heat conductivity of the extended metal element itself also tends to equalize "received" local temperatures. Additionally, the indicator means may be so constituted as to have an inherent delay in producing a visually observable response to attainment of a predetermined elevated temperature.

The inclusion of diverse variable factors in specific embodiments of the invention, noted above, facilitates tailoring of the indicator response to provide a preselected doneness indication. These factors include selection of indicator substances (to establish the indicator temperature at which change of appearance occurs), and, for determining the response time of the indicator to the attainment of such temperature in the body, the use or omission of a heatabsorptive coating on the metal element surface facing the body being heated, the nature and thickness of any member interposed between the metal element and the body, and the positioning of the metal element relative to the body.

Further features and advantages of the invention will be apparent from the detailed description hereinbelow set forth, together with the accompanying drawing.

DETAILED DESCRIPTION

Figure 1:
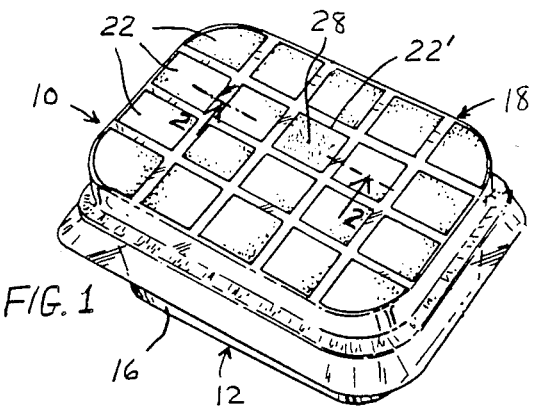
FIG. 1 is a perspective view of a container for holding a body of foodstuff for heating in a microwave oven, incorporating an illustrative embodiment of the present invention.
Figure 2:
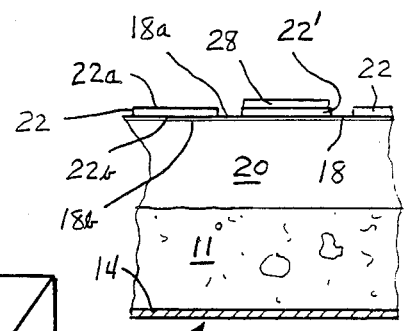
FIG. 2 is an enlarged fragmentary sectional view taken along the line 2—2 of FIG. 1.

The invention will be described, with reference to the drawing, as embodied in a system including a package or container 10 for use in microwave heating of a contained body of foodstuff 11. The container is shown as being of one of the types described in applicant's copending U.S. patent application Ser. No. 662,992, filed Oct. 19, 1984 (now U.S. Pat. No. 4,656,1325), entitled "Microwave Heating Package and Method," the disclosure of which is incorporated herein by this reference. Specifically, the container includes a stiff metal (e.g. aluminum) foil base member 12 having a bottom 14 and side walls 16 cooperatively defining an upwardly open chamber within which the body 11 of foodstuff is disposed, and a lid 18 of microwave-transmissive dielectric material such as paper or plastic closing the top of the chamber. Such a container may be provided as a disposable package for a frozen food or the like.

The container lid has upper and lower major surfaces 18a and 18b respectively facing away from and toward the contained body of foodstuff. As described in the aforementioned application, the lower lid surface 18b is spaced above the surface of the foodstuff by a gap 20, and a plurality of spaced-apart metal (e.g. aluminum) foil islands 22 are bonded to the upper lid surface 18a. The aforementioned application explains that the array of metal islands 22 and the gap 20 cooperatively enhance coupling of microwave energy into the interior of the container, i.e. when the container holding the foodstuff body is disposed in a microwave over 24 (FIG. 4) and irradiated therein with microwave energy for heating the foodstuff.

Each of the metal islands 22 is a thin (foil gauge) electrically conductive metal element having first and second opposed extended surfaces (i.e., opposed major surfaces) 22a and 22b. The surface 22b faces downwardly toward the foodstuff and is bonded to the lid surface 18a, while the surface 22a faces upwardly (outwardly from the container) so as to be visible through the window 26 of the microwave oven 24 when the container is within the oven.

Figure 3:
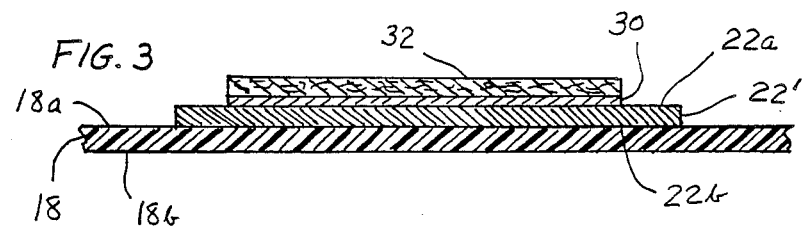
FIG. 3 is a further enlarged fragmentary sectional view, again taken as along the line 2—2 of FIG. 1, showing details of a particular type of indicator means usable in the embodiment of FIG. 1.

In accordance with the present invention, in its illustrated embodiment, one of the islands 22 (such island being designated 22') bears on its upper surface indicator means constituted of an adherent layer or multilayer structure 28 which undergoes a visually observable change of appearance upon attaining a predetermined elevated temperature. One exemplary form of such structure 28, illustrated in FIG. 3, includes a first layer 30 of ink or other colorant material, essentially thermally stable throughout the temperature range of interest, and a second layer 32 comprising or containing a substance that undergoes a change of state (e.g. from solid to liquid) upon attaining the aforementioned predetermined elevated temperature. This second layer 32, deposited on and covering the ink layer 30, is effectively opaque at temperatures below the predetermined elevated temperature, so as to mask the subjacent ink color. However, when it reaches the predetermined elevated temperature, it becomes substantially transparent, revealing the previously concealed ink color and thereby providing a visually observable change of appearance.

The state-changing substance of the layer 32 may (for example) be a meltable crystalline material, such as a wax, a fatty acid, or the like, or a mixture of more than one such material, which material or mixture is effectively opaque when solid (by virtue of scattering of light by the crystals) but which becomes transparent when molten. By appropriate selection or mixture of fatty acids, for instance, one can select a desired melting point. One currently preferred substance for the layer 32 is a mixture of stearic acid and sodium stearate, the latter compound serving to enhance scattering and to raise the melting point.

Preferably, the layer 32 in this embodiment also incorporates a normally effectively opaque porous web, such as a sheet of paper, extending over the entire colored subjacent layer 30 and in intimate contact with the state-changing substance. The paper may conveniently be impregnated with the crystalline substance, i.e. constituting a matrix therefor. When wetted by melting of the state-changing substance, the paper becomes substantially transparent, and the subjacent colored layer is revealed. An advantage of using the paper is that the amount of crystalline state-changing substance required for the layer 32 may be substantially reduced, owing to the contribution of the paper to the overall opacity of the layer at temperatures below the melting point of the crystalline substance.

The combination of a porous web of paper or the like with a state-changing substance such as a mixture of stearic acid and sodium stearate in the layer 32 is an example of an indicator wherein the visually observable change of appearance is delayed after attainment of the predetermined elevated temperature, because the paper becomes sufficiently transparent to reveal the color of ink layer 30 only after the state-changing substance has diffused through the paper, and this diffusion occurs over an interval of time after initial melting of the state-changing substance. Thus, the described indicator provides a "time-temperature" indication which is often desired for indicating doneness.

The ink layer 30 may be any desired color, black being found particularly suitable. When opaque, the masking layer 32 is typically white or whitish in appearance; thus the change of the indicator means to a black color upon attaining the predetermined elevated temperature provides a very clearly discernable indication. Other types of surface coloring materials may be used for layer 30, and be may be applied either as a continuous color spot or discontinuously, e.g. to form a readable legend such as "DONE" which appears when the crystalline substance of layer 32 melts.

Stated more generally, the indicator means 28 may comprise or include a substance or structure that undergoes a visible change in appearance at the predetermined elevated temperature through physical and/or chemical alteration in response to the attainment of that temperature. As a further example, it may constitute a single layer of a thermochromic substance that changes color upon reaching such temperature, the layer being deposited on the surface 22a of the foil island 22'. Among materials possessing this characteristic are transition or slightly post-transition element - halide complexes such as Cd- or Hg-I complexes, e.g. tetraiodomercury. When the body to be heated in the container is a foodstuff, of course, it is important to avoid use of toxic substances in the indicator means, a consideration which limits the applicability of these thermochromic substances.

Figure 4:
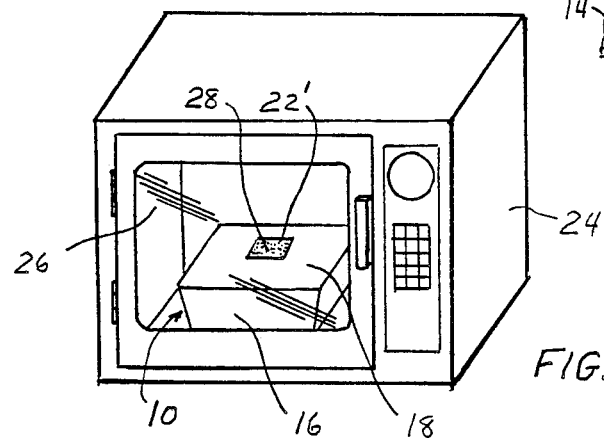
FIG. 4 is a simplified schematic perspective view of a microwave oven, in itself conventional, having disposed therein a container of the general type shown in FIG. 1 incorporating an embodiment of the invention.

As will be apparent from FIG. 4, wherein only the single island 22' is shown for simplicity, the indicator-bearing upper surface of the latter island is clearly visible through oven window 26 when the container 10, with its lid 18, is placed in the oven 24 for microwave heating of the contained foodstuff body 11. The container constitutes a structure or means for supporting this island and the adhered indicator layer or layers within the oven, in a position such that the indicator means is thus externally visible, and such that the island 22' receives heat from the body by conduction or radiation as the body is heated in the oven by irradiation with microwave energy.

Accordingly, the method of the invention, in the described embodiment, includes the steps of placing the body of foodstuff 11 in its container 10 with lid 18, metal foil island 22' and indicator means 28 in the microwave oven 24 as illustrated in FIG. 4, and irradiating the container with microwave energy in the oven to heat the foodstuff, the heat being produced internally in the body 11 by such irradiation; and, as irradiation and consequent heating continue, observing the visible indicator means 28 through the oven window to detect the change of appearance (e.g. white to black, when the state-changing substance of layer 32 melts) that occurs upon attainment by the layer 32 of the aforementioned predetermined elevated temperature. As further explained below, the change of appearance of the indicator means is a doneness signal; hence the heating of the foodstuff may then be terminated, by shutting off the microwave oven.

During this operation, the chief or only significant source of heat in the oven for elevating the temperature of the foil island 22' and indicator means 28 is the body 11 itself. Although the substance or substances constituting the indicator means may be directly heatable by microwave energy, the dimensions of the foil island or element 22' (in particular, its thickness) and the disposition of the indicator means on an extended surface of this element are such as effectively to shield the indicator material layer or layers from temperature-elevating microwave irradiation. Consequently, the change of appearance of the indicator means is caused by (and representative of) the microwave heating of the foodstuff body, as desired for reliance on this change as an indication of doneness of the body.

In this regard, it may be explained that a thin electrically conductive metal element such as the foil island 22' functions as a shield for the surface-deposited indicator material because in the case of an indicator means or material which is significantly absorptive of (and thus directly heatable by) microwave radiation, the absorption is dependent on the magnitude of the electric field components of the incident radiation; and microwave electric field components which are tangential in a vectorial sense become imperceptibly small at the surface of a highly conductive thin metal element. The thickness of ordinary aluminum foil is suitable to provide this shielding effect. Other thin metallic bodies may also be used as the shielding metal element of the invention, provided that the element is thick enough not to act as a susceptor, and is not so thick that the tangential fields are no longer small. These constraints on metal element thickness will be readily apparent to persons of ordinary skill in the art, who will be enabled to select appropriate thicknesses accordingly.

A further beneficial effect of the metal element or island is that, owing to its area and thermal conductivity, it serves to equalize the temperature at the indicator if there is localized unevenness of heat reaching the island. Thus, minor local temperature variations do not produce an erroneous indication.

The change of appearance of the indicator means, caused by attainment of the predetermined temperature by the indicator, does not occur instantaneously upon attainment of that same temperature by the foodstuff body 11. Rather, there is a delay occasioned both by the gap 20 and by the material of the lid 18 which is interposed between the island 22' and the foodstuff body, the lid being a microwave-transmissive dielectric member having relatively low thermal conductivity. In addition, if the lower surface of the island 22' is heat-reflective, transmission of radiated heat to the indicator is further retarded. These delay factors are advantageously selected or tailored so that the attainment of the predetermined temperature by the indicator, and resultant change of appearance, occur substantially concurrently with the attainment of a desired degree of doneness by the body 11. In other words, the change of appearance of the indicator thus serves as an indication of doneness rather than instantaneous temperature of the body.

To vary the delay, the gap and/or the lid thickness or material may be altered. Also, or alternatively, the lower surface 22b of the island 22' may be provided with a black, heat-absorptive coating, to enhance absorption of radiated heat and reduce the delay. Additionally, as described above, the indicator means itself may be constituted to have a built-in delay; i.e., it may be of such a character as to undergo an observable change in appearance only after some interval following its initial attainment of the predetermined elevated temperature.

In some instances, it may be possible to deposit the indicator means directly on a side wall 16 of the foil container body which is visible through the oven window. The foil wall then constitutes the metal element of the invention, and the whole container again serves as the means for supporting this element with the indicator means in the oven. Such an arrangement, however, provides essentially no delay mechanism, and the indicator merely serves to indicate the temperature attained by the nearest part of the food body, which may in certain cases by an adequate approximation of desired doneness.

Frequently, it is desired to determine doneness on the basis of attainment of a desired temperature by that region of the food body which heats most slowly, having regard to the usual unevenness of heating in a microwave oven. To this end, the indicator-bearing metal island may be disposed on that part of the lid overlying the slow-heating region of the food body, which is typically the central region of the body as viewed in plan. In applicant's copending U.S. patent application Ser. No. 878,171, filed June 25, 1986, entitled "Microwave Container and Method of Making Same" and incorporated herein by this reference, container structures are described having arrangements of metal foil islands or the like (e.g. on the lid) for modifying the microwave field patterns within the container, thereby to beneficially alter the heating pattern of the contained body of food or other material. Such islands, which may be located above "cooler" parts of the food body, can be used as the metal element of the systems and methods of the present invention; i.e. indicator means may be applied to a foil island of a container of a type shown in the lastmentioned application.

In all embodiments, it is important that the metal element itself not be a significant source of heat for the indicator means. Thus, care must be taken in the design of this metal element to avoid resonance if the metal structure is resistive or very thin and thus subject to heating under resonant conditions.

The invention has been exemplified in the foregoing description by particular embodiments in which the change of appearance, resulting from a heat-induced chemical or physical change in the indicator means, is manifested as a change of color within the optical spectrum detectable by the human eye. Other types of changes, however, are equally embraced by the invention in its broader aspects. For example, the change of appearance may be observable only in the infrared portion of the spectrum, and for its detection, the indicator means may be scanned by a suitable infrared detector which may be disposed either within the oven cavity (though outside, and spaced from, the container that holds the body of material being heated) or, like the eye of a human observer, outside the oven. The term "visually observable" is thus intended to embrace observation by scanners or detectors other than the human eye, while "externally visible" includes dispositions (of the indicator means) visible or detectable by such a scanner at any location (within or outside the oven) external to the body being heated and to any container enclosing the body.

Further, the change of appearance may be a change in shape or configuration of all or some portion of the indicator means. For instance, the indicator may comprise a metal or plastic strip formed with a "memory" that tends to cause it to curl or bend, but adhered flat to the surface of the metal element of the invention by a temperature-sensitive adhesive. When a predetermined elevated temperature is attained by the adhesive, the strip is released by the adhesive and curls or bends upwardly to indicate doneness. Alternatively, the strip may be of such a character that its "memory" is activated, upon attainment of a predetermined elevated temperature, to overcome and break the bond of an adhesive which, in such case, need not be temperature-sensitive over the temperature range of interest. Again, an indicator comprising two bonded plastic strips having respectively different thermal expansion properties, lying on and secured at one end to the metal element surface, may be arranged to curl or bend upwardly at its free end upon attaining a predetermined elevated temperature.

It is to be understood that the invention is not limited to the features and embodiments hereinabove specifically set forth but may be carried out in other ways without departure from its spirit.

I claim:

1. A system for indicating doneness of a body of material heated by microwave energy, comprising a thin electrically conductive metal element having first and second opposed extended surfaces; indicator means disposed on the first surface of the element for producing a visually observable change of appearance upon being heated to a predetermined elevated temperature or upon being maintained at such temperature for a predetermined time; and means for supporting the element in substantially fixed relation to and externally of the body, when the body is disposed in a microwave oven for heating by microwave energy, such that the element is also disposed in the oven with the indicator means positioned to be externally visible, and such that the element receives heat from the body by conduction and/or radiation as the body is heated by microwave energy; the dimensions of the element and the disposition of the indicator means thereon being such as substantially to shield the indicator means from temperature-elevating irradiation by microwave energy.

2. A system as defined in claim 1, wherein said indicator means undergoes a physical change upon attaining said predetermined elevated temperature.

3. A system as defined in claim 2, wherein said indicator means includes a substance that undergoes a change of state upon attaining said predetermined elevated temperature.

4. A system as defined in claim 3, wherein said indicator means comprises a first layer characterized by a visually distinctive color, applied to the first surface of the element, and a second layer outwardly covering the first layer and comprising said substance, said second layer being substantially opaque at temperatures below said predetermined temperature so as to mask said first layer, but becoming substantially transparent, so as to reveal said first layer, when said substance undergoes said change of state.

5. A system as defined in claim 4, wherein said second layer comprises a substance that melts at said predetermined temperature.

6. A system as defined in claim 5, wherein said second layer further comprises a substantially opaque porous web, extending over said first layer and in intimate contact with said substance, that becomes substantially transparent when wetted by melting of said substance.

7. A system as defined in claim 1, wherein said indicator means comprises a layer of a substance that undergoes a visually observable chemical change upon attaining said predetermined elevated temperature.

8. A system as defined in claim 1, wherein said second surface of said element is a heat-reflective surface.

9. A system as defined in claim 1, wherein said second surface of said element bears a heat-absorptive coating.

10. A system as defined in claim 1, wherein said supporting means includes a sheetlike dielectric member transmissive to microwave energy and having opposed major surfaces for respectively facing inwardly toward and outwardly away from said body, and wherein said element is secured to the outwardly facing surface of said dielectric member.

11. A system as defined in claim 10, wherein said element is a metal foil member.

12. A system as defined in claim 1, wherein said supporting means comprises a container having wall structure for at least partially enclosing said body, and wherein said element is included in said wall structure.

13. A system as defined in claim 12, wherein said wall structure includes a lid for the container, said lid comprising a member of dielectric material transmissive to microwave energy, and having inner and outer major surfaces, and wherein said element is disposed at the outer surface of said lid.

14. A system as defined in claim 13, wherein said element is a metal foil island bonded to the outer surface of said lid.

15. A system as defined in claim 14, further including a body of material to be heated by microwave energy, said body being disposed in said container.

16. A system as defined in claim 15, wherein said lid is spaced from said body.

17. A system as defined in claim 15, wherein said container, including said element, and said body cooperatively define a microwave field pattern that determines the rapidity of heating of various regions of said body, such that at least one region of said body heats more slowly than another region of said body, and wherein said element is disposed on said lid in directly overlying relation to said one region.

18. A system as defined in claim 15, further including a microwave oven in which said container is disposed in a position for heating of said body by microwave energy.

19. A system as defined in claim 1, wherein said element is shaped and dimensioned to interact with irradiating microwave energy for affecting heating of the body.

20. A method of determining the doneness of a body of material heated by microwave energy comprising placing, in a microwave oven for heating, said body together with a thin electrically conductive metal element having first and second opposed extended surfaces and bearing on its first surface indicator means for producing a visually observable change of appearance upon being heated to a predetermined elevated temperature or maintained at such temperature for a predetermined time, said element being supported in the oven, in substantially fixed relation to and externally of the body with the indicator means positioned to be externally visible, such that the element receives heat from the body by conduction and/or radiation when the body is heated, the dimensions of the element and the disposition of the indicator means thereon being such as substantially to shield the indicator means from temperature-elevating irradiation by microwave energy; and, while energizing the oven to heat the body with microwave energy, observing the indicator means to detect the occurrence of said change of appearance.

21. A method according to claim 20, further including the step of terminating the heating of the body when said change of appearance occurs.

* * * * *